Patented Apr. 16, 1935

1,998,219

UNITED STATES PATENT OFFICE 1,998,219

CATALYST AND PROCESS FOR THE PRODUCTION OF ORGANIC ACIDS

Ralph Lyman Brown, Syracuse, N. Y., assignor to Atmospheric Nitrogen Corporation, New York, N. Y., a corporation of New York No Drawing. Application October 4, 1932, Serial No. 636,251. In Canada June 17, 1932

28 Claims. (Cl. 260—116)

This invention relates to the production of oxygenated organic compounds of the type of organic acids, more particularly to processes for the production of aliphatic acids, particularly acetic acid from methanol and carbon monoxide, and catalytic agents therefor.

Various catalytic agents have been proposed for the synthesis of aliphatic acids from carbon monoxide and an aliphatic alcohol particularly methanol and/or hydrogen. The problem is complicated when a single acid is desired because of the variety of side reactions which may occur. For satisfactory commercial use the catalyst not only should be active for the production of the desired end product but it should not promote any of the numerous other possible reactions resulting in the consumption of the methanol and the production of such substances as hydrocarbons, aldehydes and other acids, or the decomposition or cracking of the reacting materials with consequent deposition of carbon on the catalyst and loss in activity. Furthermore, the catalyst to be commercially usable must be stable in the sense of not undergoing excessive deterioration of its catalytic activity when employed under practical working conditions for prolonged periods of time.

I have found that the desired acetic acid reaction is promoted by the novel catalytic agents hereinafter described comprising tungsten. I have found that oxide of tungsten as disclosed hereinafter will catalyze the production of acetic acid from methanol and carbon monoxide. The activity of the catalyst may be promoted if desired by incorporation therewith of relatively small amounts of other substances which act in the sense of preventing undesired decomposition or reactions of the methanol, or rendering the catalyst material heat resistant and stable or in some other and as yet not clearly understood manner so that the activity per se for acetic acid formation is increased and the production of undesired side reaction products reduced. I have also found that oxide of tungsten as disclosed hereinafter will similarly catalyze the production of propionic acid from ethanol and of butyric acid from normal propanol. That is to say, the type of catalyst developed by me is of particular advantage for the production from an aliphatic alcohol, of the acid containing one more carbon atom in the molecule. If the alcohol is represented by R—OH, the acid may be represented by R—COOH.

The reaction is preferably carried out at elevated temperatures between about 300° to 400° C. and at pressures between about 100 to 700 atmospheres, preferably within the range 300–700 atmospheres and, when acetic acid is the desired product, with a carbon monoxide-methanol (molecular) ratio in the reacting gases of about 5 to 25 mols. of carbon monoxide to 1 mol. of methanol. Water vapor is also advantageously present in amount in excess of 1 molecular weight per molecular weight of methanol, and preferably about four mols. per mol. of methanol. The reaction gases may be passed over the catalysts at inlet space velocities of about 1,000 to 30,000.

The following examples illustrate my invention:

*Example I.*—To 500 cc. half normal nitric acid add simultaneously and with good stirring a substantially saturated solution of para hexahydrated ammonium tungstate containing 200 grams of the hexahydrated salt in about 2500 cc. of water, and concentrated nitric acid, in such proportions that the acid strength of the mixture is maintained between about .5 and 1 normal and while maintaining the temperature at about 100° C. The total amount of acid is about 1½ parts by weight of $HNO_3$ for each part by weight of the hexahydrated salt. After a short time, ten to twenty minutes, the precipitation of a yellowish or canary colored highly active form of hydrated tungsten oxide is substantially complete and it is then separated by filtration and dried at about 165° C. About eight hours heating is sufficient. Care should be taken that no undue delay occurs between or during these steps in the treatment of the precipitate to avoid any undesirable change from the desired hydrated form. The resulting cake is crushed and preferably pelleted.

*Example II.*—Add slowly 100 grams of para-ammonium tungstate, having a particle size of about 100–200 mesh, to 500 cc. of water containing 22 cc. of 70% nitric acid, thoroughly agitating and maintaining the acid at its boiling point during the addition of the para-ammonium tungstate. The heating and the agitation are continued for about 5 minutes after the completion of the addition. The resulting mixture is then transferred to an evaporation vessel, most of the volatile portion is removed by evaporation and the remaining mass dried in an oven at about 165–170° for a period of eight hours, crushed and pelleted. The resulting catalyst is a highly active form of hydrated tungsten oxide.

A catalyst may likewise be prepared in a manner similar to the foregoing except that the solid para-ammonium tungstate is added to 500 cc. of an aqueous solution of nitric acid containing 190 grams of $HNO_3$ instead of the more dilute acid solution and the resulting tungsten oxide filtered from the liquor instead of the mixture being evaporated down.

*Example III.*—200 g. of finely divided para-ammonium tungstate are added to 1 liter of boiling water with thorough agitation. To the resulting suspension concentrated nitric acid containing 96 grams $HNO_3$ (equal to 2.4 times the theoretical or stoichiometric requirement) is slowly added with continued agitation and the mixture being maintained at its boiling point for 5 minutes after completion of the addition of the nitric acid. The resulting slurry is then subjected to filtration, and the hydrated oxide so recovered is then dried at about 170° C., crushed and pelleted and will be found to be highly active.

The procedure of Examples II and III have an added advantage, compared with that of Example I in view of the limited solubility of the ammonium tungstate and the desirability of avoiding using an unnecessarily large volume of liquor.

*Example IV.*—Prepare tungsten oxide by treating 4200 cc. of 5% solution of hexahydrated ammonium tungstate with 425 cc. of 70% nitric acid at about 100° C. The 425 cc. of acid contain about 423 grams of $HNO_3$. The ammonium tungstate requires about 42 grams of $HNO_3$ for reaction to form tungsten oxide, leaving an excess of about 381 grams of nitric acid, which in the reaction mixture is equivalent to a nitric acid solution about 1.5 N. Separate the precipitate, wash sparingly with water and incorporate with the wet precipitate nitrates of zinc, beryllium and bismuth in amounts corresponding to the following composition expressed as oxides of the metals: oxide of tungsten, $WO_3$, 90 mols.; oxide of zinc, ZnO, 10 mols.; oxide of beryllium, BeO, 0.6 mol.; and oxide of bismuth $Bi_2O_3$, 2.5 mols. Dry the homogeneous mixture at about 165° C. (four hours will be sufficient), then crush and compress into tablet or pill form.

*Example V.*—Prepare tungsten oxide as in Example IV. Impregnate the wet oxide precipitate with a solution of copper and beryllium nitrates in amounts corresponding to the following composition expressed as oxides: Oxide of tungsten, $WO_3$, 90 mols.; oxide of copper, CuO, 10 mols.; oxide of beryllium, BeO, 0.6 mol. Dry the resulting mixture at about 165° C. (five hours is sufficient), then crush and compress into tablet form.

*Example VI.*—Prepare tungsten oxide as in Example IV. Add to the wet oxide precipitate nitrates of zinc, copper and beryllium in amounts corresponding to the following composition expressed as oxides: oxide of tungsten, $WO_3$, 90 mols.; oxide of zinc, ZnO, 7 mols.; oxide of copper, CuO, 3 mols.; oxide of beryllium, BeO, 0.6 mol. Dry the resulting mixture and compress into pill form as in Example IV.

*Example VII.*—Prepare tungsten oxides as in Example IV. Add to the wet oxide precipitate nitrates of titanium, bismuth and beryllium in amounts corresponding to the following composition expressed as oxides: oxide of tungsten, $WO_3$, 90 mols.; titanium oxide, 10 mols.; oxide of bismuth, $Bi_2O_3$, 2.5 mols.; and oxide of beryllium, BeO, 0.6 mol. Dry the mixture and compress into pill form as in Example IV.

10 mols. oxide of silica, $SiO_2$, or oxide of thorium, $ThO_2$, may be substituted for the titanium oxide in this example.

*Example VIII.*—Prepare tungsten oxide as in Example IV. Add to the wet oxide nitrates of aluminum, zinc and bismuth in amounts corresponding to the following composition expressed as oxides: oxide of tungsten, $WO_3$, 90 mols.; oxide of aluminum, $Al_2O_3$, 0.3 mol.; oxide of zinc, ZnO, 10 mols.; and oxide of bismuth, $Bi_2O_3$, 2.5 mols. Dry the mixture and compress into tablet form as in Example IV.

.6 mol. cerium oxide, $CeO_2$, may be substituted for the aluminum oxide in this example.

*Example IX.*—A catalyst prepared for example, as described in Example I, is placed in a converter of 28% chrome iron alloy. A methanol-carbon monoxide mixture containing 11.4 mols. CO and 4 mols. water per mol. methanol under a pressure 300 atmospheres and space velocity of 4000 is passed through the converter, the catalyst mass being at a temperature of about 385° C. The gaseous mixture leaving the converter may be treated as in Example XII.

*Example X.*—A catalyst prepared for example as described in Example I is placed in a converter of a chromium-vanadium alloy provided with a silver lining. An ethanol carbon monoxide mixture containing 16 mols. CO and 4 mols. $H_2O$ per mol. ethanol under a pressure of 300 atmospheres, and space velocity of 4000 to 16000 is passed through the converter, the catalyst mass being at a temperature of 375° to 385° C. The condensate obtained from the gaseous mixture leaving the converter in addition to unchanged ethanol and water consists mainly of propionic acid.

*Example XI.*—A catalyst prepared for example as described in Example I is placed in a converter of a chromium-vanadium alloy provided with a silver lining. A normal propanol-carbon monoxide mixture containing 20 mols. CO and 4 mols. $H_2O$ per mol. normal propanol under a pressure of 300 atmospheres and space velocity of 4000 to 16000 is passed through the converter, the catalyst mass being at a temperature of 300° to 350° C. The condensate obtained from the gaseous mixture leaving the converter in addition to unchanged normal propanol and water consists mainly of butyric acid.

*Example XII.*—A tungsten catalyst prepared for example as described in Example IV is placed in a converter capable of withstanding high pressure and lined with silver. A methanol-carbon monoxide gas mixture containing 5.7 mols. CO and 4 mols. water vapor per mol. methanol under a pressure of 200 atmospheres and space velocity of 2000 is passed through the converter, the catalyst mass being at a temperature of about 375° C. The gaseous mixture leaving the converter is cooled to about 20° C. The condensate containing acetic acid, water, methyl acetate and unchanged methanol, together with small amounts of methyl formate and formic acid, may be distilled to recover the free acetic acid and its methyl ester. The methanol fraction of the condensate may be returned to the process together with the residual uncondensed gases containing unreacted carbon monoxide and in some cases a certain amount of dimethyl ether, suitable adjustment being made by introduction of fresh gases to maintain the desired relationship between the methanol, carbon monoxide and water vapor and by bleeding to prevent excessive accumulation of inert constituents particularly methane.

The aqueous portion of the condensate may also be returned in amount sufficient to maintain the desired water content of the reaction gases in which case the separation of acetic acid therefrom need not be so complete.

*Example XIII.*—A tungsten catalyst prepared for example as described in Example V is placed in a converter capable of withstanding high pressure and lined with silver. A methanol-carbon monoxide mixture containing 5.7 mols. CO (also preferably about an equal quantity of hydrogen) and 4 mols. water per mol. methanol under a pressure of 200 atmospheres and space velocity of 4000 is passed through the converter, the catalyst mass being at a temperature of about 375° C. The gaseous mixture leaving the converter may be treated as in Example XII.

It appears important that the tungsten should be present in a hydrated oxide form and in a high state of oxidation preferably approximating that of the oxide $WO_3$ and not less than that of the oxide $W_2O_5$. The presence of water vapor in the methanol-carbon monoxide mixture assists in maintaining the tungsten in this condition during use of the catalyst.

I have also found that by observing certain conditions during the preperation of the catalyst, the formation of the desired hydrated form of tungsten is favored. For example, the hexahydrated ammonium tungstate (often referred to as the para salt) is preferred as compared with metal salts such as the salts of potassium or sodium. The advantage of the ammonium salt may be due to the difficulty of satisfactory removal of the alkali (sodium or potassium) from the tungsten precipitate. As precipitating acids, the volatile nitric or hydrochloric acids are preferred to sulfuric. The temperature of precipitation is in the neighborhood of 100° C. rather than at ordinary temperature and the acid concentration of the aqueous medium, particularly when the tungsten compound is in solution as distinguished from suspension therein, is maintained below about 5 normal and preferably not more than 1 normal.

As stated hereinabove, the tungsten oxide should be in hydrated form. The conditions for drying of the catalyst are therefore important and a temperature above 500° C. should be avoided as the oxide then approximates the dehydrated condition. While I have found that a temperature of drying as high as about 400° C. may be used for some of the promoted compositions while still maintaining the major portion of their activity, a temperature within the range of 150° to 180° C. is preferred. The composition of catalyst materials dried at such a temperature corresponds to a degree of hydration corresponding to about .2 to .5 mol. $H_2O$ per mol. $WO_3$, and it is believed that the catalyst material is a mixture of hydrated varieties or forms of tungsten oxide, that the yellow oxide or true hydrate of the oxide in which the water is combined with the oxide molecule in definite proportions predominates in amount and is relatively the active catalytic portion and that the white oxide or hydrous oxide in which the ratio of water to oxide progressively varies with temperature and other conditions is present in less amount and functions as the carrier or support on which the catalytically active oxide is distributed.

The active form of tungsten oxide ready for use in the converter is relatively soluble in ammonia as compared with a deteriorated and more or less inactive catalyst which is relatively insoluble. It is believed that the change in solubility corresponds to a change in the hydrated oxide into a more dehydrated crystalline variety somewhat analogous to the change which hydrated silica or silicic acid undergoes upon long continued heating.

For example, it has been found that the tungsten oxide catalyst material which has been used for catalyzing the reaction of methanol and carbon monoxide until it had become relatively inactive, was but slightly soluble in boiling ammonium hydroxide initially containing 28% $NH_3$ even after boiling for four to five hours with the $NH_3$ in the solution being replenished. On the other hand, a fresh active tungsten oxide catalyst of this invention readily dissolves in ammonium hydroxide. Thus, a quantity of the active catalyst dissolves substantially completely (except for any foreign material which may be present such as carbon, metal impurities, etc.) when placed in ammonium hydroxide at room temperature and then raised to the boiling point. The time required for thus dissolving about 1 part of tungsten oxide catalyst in 20 parts of ammonium hydroxide is about 15 minutes.

With respect to the promoted tungsten catalysts, while the function of each ingredient of the catalyst is not definitely known and in any case is probably the result of several interdependent factors, it appears that bismuth acts not only as a promoter of the tungsten per se but also to prevent decomposition or "cracking" of the reacting gases with resultant carbonaceous deposition on or "fouling" of the catalyst. In a tungsten catalyst such as that of Example V which does not contain bismuth, it was found that the inclusion of a substantial amount of hydrogen in the gaseous reaction mixture has much the same effect in inhibiting catalyst "fouling". The maintenance of water vapor in the reaction mixture also seems to be important to inhibit catalyst "fouling". Beryllium appears to function in part at least to give thermal stability to the catalyst. Bismuth and beryllium may, therefore, be considered as secondary promoter substances in that while they may affect in some degree the catalytic activity of the tungsten, they also appear to be important in their effect upon the course of side reactions, such as "cracking" of the reacting gases. Other substances appear to act primarily as promoters of the catalytic activity of the tungsten or to make the catalyst more resistant to deterioration, among which are zinc, copper, aluminum, silica, thorium, cerium and titanium. The catalysts of this invention, therefore, may comprise tungsten (particularly hydrated tungsten oxide in which the state of oxidation is not less than that represented by $W_2O_5$), a primary promoter from the group comprising the oxides of zinc, copper, aluminum and titanium, and a secondary promoter from the group comprising the oxides of bismuth and beryllium.

The oxide of tungsten constituent of the catalyst material may be considered as an acid oxide relative to the other constituents and it is preferably in substantial excess, which excess should be at least 100 per cent over that theoretically required to combine with the more basic constitutents.

I have found that in using a hydrated tungsten oxide catalyst as described hereinbefore for the production of acetic acid from methanol and carbon monoxide, the amount of by-products formed and rate of deterioration of the catalyst is greatly reduced if the operating pressure is not less than about 300 atmospheres. This reduction in by-product formation and catalyst deterioration may be somewhat increased by further increasing the pressure used up to, for example, 700 atmospheres. By thus operating within the range of 300 to 700 atmospheres, not only may the advantages of an increased conversion of methanol per unit of time and unit volume of catalyst be obtained, but at the same time the formation of undesired by-products and loss in activity of the catalyst is decreased.

I have also found that it is of advantage to use with the elevated pressures of this invention, slightly higher temperatures than those heretofore considered suitable for similar processes operating at relatively lower pressures, and further, when higher pressures within the range of 300 to 700 atmospheres are employed the temperatures for optimum results are somewhat higher than those giving optimum results at the lower pressures of this range of 300 to 700 atmospheres. Temperatures of about 375° to about 400° C. are suitable for the operation of the process of this invention using a hydrated oxide of tungsten catalyst, with the lower temperatures of this range of 375° to 400° C. preferred when using pressures of 300 atmospheres and above, and the higher temperatures of the range given are preferred as the pressures used are increased upwardly towards 700 atmospheres.

At 300 atmospheres the rate of fouling is many times less than under similar operating conditions except for the use of a pressure of 50 atmospheres and is only about one-third of that at 200 atmospheres. At 680 atmospheres the rate of fouling is further and substantially reduced as compared to 300 atmospheres. The amount of methane produced measured in terms of the ratio of methane to acetic acid decreases rapidly with increase in pressure above 50 atmospheres and reaches a minimum in the neighborhood of 300 atmospheres with but slight change thereafter.

The term "space velocity" as used hereinabove denotes the volume of non-condensable gas in liters (measured at one atmosphere and room temperature) introduced into the converter per hour per liter of catalyst material.

When in the claims reference is made to an acetic acid catalyst or acetic acid, it is intended to include such derivatives of the free acid as the methyl ester or methyl ether since they are a source as such, or upon further catalytic treatment, of acetic acid.

This application is a continuation in part of my co-pending U. S. application, Serial No. 545,850, filed June 20, 1931.

I claim:

1. A process for the preparation of a catalyst for the production of an oxygenated organic compound from an aliphatic alcohol and a carbon monoxide gas which comprises reacting with an acid a water soluble tungstate in an aqueous medium and maintaining the acidity of said aqueous medium below about 5 N during the reaction of said acid and tungstate.

2. A process for the preparation of a catalyst for the production of an oxygenated organic compound from an aliphatic alcohol and a carbon monoxide gas which comprises reacting with an acid para-ammonium tungstate in an aqueous medium and maintaining the acidity of said aqueous medium below about 5 N during the reaction of said acid and tungstate.

3. A process for the preparation of a catalyst for the production of an oxygenated organic compound from an aliphatic alcohol and a carbon monoxide gas which comprises reacting with nitric acid para-ammonium tungstate in an aqueous medium having an acidity below about 5 N maintained at a temperature of about 100° C., separating the resulting solid from the solution and drying the solid at a temperature below about 500° C.

4. A process for the preparation of a catalyst for the production of an oxygenated organic compound from an aliphatic alcohol and a carbon monoxide gas which comprises reacting with nitric acid para-ammonium tungstate in an aqueous medium having an acidity of not more than about 1 N while maintaining the temperature at about 100° C., separating the solid material thus obtained from the reaction mixture and heating the separated solid at a temperature between about 150° to 180° C.

5. A process for the production of an organic acid which comprises reacting a gas containing carbon monoxide with an aliphatic alcohol in the presence of hydrated oxide of tungsten as a catalyst.

6. A process for the production of an aliphatic organic acid which comprises reacting a gas containing carbon monoxide with an aliphatic alcohol in the presence of hydrated oxide of tungsten as a catalyst, said oxide of tungsten having a degree of hydration corresponding to about .2 to .5 mol. $H_2O$ per mol. of $WO_3$.

7. A process for the production of an aliphatic organic acid which comprises reacting a gas containing carbon monoxide with an aliphatic alcohol in the presence of hydrated oxide of tungsten soluble in aqua ammonia as a catalyst.

8. A process for the production of an aliphatic organic acid which comprises reacting a gas containing carbon monoxide with an aliphatic alcohol in the presence of hydrated oxide of tungsten as a catalyst, said oxide of tungsten being in a state of oxidation not below that represented by $W_2O_5$.

9. A process for the production of an aliphatic organic acid which comprises reacting a gas containing carbon monoxide with an aliphatic alcohol in the presence of tungsten oxide as a catalyst prepared by reacting with an acid a suspension in an aqueous liquid of a solid finely divided tungstate.

10. A process for the production of acetic acid which comprises reacting a gas containing carbon monoxide with methanol in the presence of water vapor and a catalyst the major portion of the catalytically active portion of which consists of oxide of tungsten in which the state of oxidation is not less than that represented by $W_2O_5$.

11. A process for the production of acetic acid which comprises reacting a gas containing carbon monoxide with methanol in the presence of water vapor and an oxide of tungsten as a catalyst prepared by reacting with an acid a solid finely divided tungstate in an aqueous medium.

12. A process for the production of acetic acid which comprises reacting a gas containing carbon monoxide with methanol in the presence of water vapor and hydrated tungsten oxide as a catalyst prepared by reacting a suspension in an aqueous medium of a solid finely divided tungstate with an acid.

13. A process for the production of an aliphatic organic acid which comprises reacting a gas containing carbon monoxide with an aliphatic alcohol in the presence of hydrated oxide of tungsten as a catalyst prepared by reacting a solid tungstate in an aqueous medium with an acid.

14. A process for the production of an aliphatic organic acid which comprises reacting a gas containing carbon monoxide with an aliphatic alcohol in the presence of a catalyst the major portion of the catalytically active portion of which consists of oxide of tungsten in which the state of oxidation of the tungsten is not less than that represented by $W_2O_5$.

15. A process for the production of acetic acid which comprises reacting a gas containing carbon monoxide with methanol in the presence of hydrated oxide of tungsten as a catalyst.

16. A process for the production of an aliphatic organic acid which comprises reacting a gas containing carbon monoxide with an aliphatic alcohol in the presence of a catalyst prepared by reacting with an acid a water soluble tungstate in an aqueous medium having an acidity below about 5 N.

17. A process for the production of an aliphatic organic acid which comprises reacting a gas containing carbon monoxide with an aliphatic alcohol in the presence of a catalyst prepared by reacting with an acid para ammonium tungstate in an aqueous medium having an acidity below about 5 N.

18. A process for the production of an aliphatic organic acid which comprises reacting a gas containing carbon monoxide with an aliphatic alcohol in the presence of a catalyst prepared by reacting with a mineral acid para ammonium tungstate in an aqueous medium having an acidity below about 5 N, maintained at a temperature of about 100° C., separating the resulting solid from the solution and drying the solid at a temperature below about 500° C.

19. A process for the production of an aliphatic organic acid which comprises reacting a gas containing carbon monoxide with an aliphatic alcohol in the presence of a catalyst prepared by reacting with nitric acid para ammonium tungstate in an aqueous medium having an acidity of not more than about 1 N while maintaining the temperature at about 100° C., separating the solid material thus obtained from the reaction mixture and heating the separated solid at a temperature between about 150° to 180° C.

20. A process for the production of an aliphatic organic acid which comprises reacting a gas containing carbon monoxide with an aliphatic alcohol in the presence of a catalyst prepared by reacting with an acid a solid finely divided tungstate in an aqueous medium.

21. A process for the production of acetic acid which comprises bringing carbon monoxide, methanol and water in the gaseous state and in the proportion of more than two molecular weights of carbon monoxide and more than one molecular weight of water per molecular weight of methanol into reaction contact at an elevated temperature and pressure with a catalyst the major portion of the catalytically active portion of which consists of oxide of tungsten in which the state of oxidation is not less than that represented by $W_2O_5$.

22. A process for the production of acetic acid which comprises passing a gas containing carbon monoxide and methanol in contact with hydrated oxide of tungsten as a catalyst, said gas being passed in contact with said catalyst at a space velocity of 1000 to 30,000.

23. A process for the production of acetic acid which comprises passing a gas containing carbon monoxide, methanol and water vapor in contact with hydrated oxide of tungsten as a catalyst, said gas being passed in contact with said catalyst at a space velocity of 1000 to 30,000.

24. A process for the production of acetic acid which comprises passing a gas containing carbon monoxide and methanol in contact with a catalyst prepared by reacting with an acid a water soluble tungstate in an aqueous medium having an acidity below about 5 N, said gas being passed in contact with said catalyst at a space velocity of 1000 to 30,000.

25. A process for the production of acetic acid which comprises passing a gas containing carbon monoxide and methanol in contact with a catalyst the major portion of the catalytically active portion of which consists of tunsten oxide in which the state of oxidation of the tungsten is not less than that represented by $W_2O_5$, said gas being passed in contact with said catalyst at a space velocity of 1000 to 30,000.

26. A process for the production of an aliphatic organic acid which comprises reacting a gas containing carbon monoxide with an aliphatic alcohol in the presence of tungsten oxide as a catalyst prepared by adding an acid to a suspension in an aqueous liquid of a solid finely divided tungstate at a temperature at which yellow oxide of tungsten is formed by reaction of the acid and tungstate, separating the resulting solid and solution and drying the solid at a temperature below about 500° C.

27. A process for the production of an aliphatic organic acid which comprises reacting a gas containing carbon monoxide with an aliphatic alcohol in the presence of a catalyst prepared by reacting at a temperature at which yellow oxide of tungsten is formed an acid and a solution of a tungstate in an aqueous liquid having an acidity below about 5 N, separating the resulting solid from solution and drying the solid at a temperature below about 500° C.

28. A process for the production of an aliphatic organic acid which comprises reacting a gas containing carbon monoxide with an aliphatic alcohol in the presence of tungsten oxide as a catalyst prepared by reacting an acid and a tungstate in an aqueous medium at about 100° C., separating the resulting solid hydrated oxide of tungsten and solution and drying the solid at a temperature below about 500° C.

RALPH LYMAN BROWN.